(12) United States Patent
Lin

(10) Patent No.: US 8,453,006 B2
(45) Date of Patent: May 28, 2013

(54) COMMAND DECODING METHOD AND CIRCUIT OF THE SAME

(75) Inventor: Yung-Feng Lin, Dasi Township, Taoyuan County (TW)

(73) Assignee: Macronix International Co., Ltd., Hsinchu (TW)

( * ) Notice: Subject to any disclaimer, the term of this patent is extended or adjusted under 35 U.S.C. 154(b) by 450 days.

(21) Appl. No.: 12/820,443

(22) Filed: Jun. 22, 2010

(65) Prior Publication Data

US 2011/0161718 A1   Jun. 30, 2011

(30) Foreign Application Priority Data

Dec. 29, 2009   (TW) .............................. 98145616 A

(51) Int. Cl.
   *G06F 1/04*   (2006.01)
(52) U.S. Cl.
   USPC ........................................................ 713/600
(58) Field of Classification Search
   USPC .......................................... 713/600; 710/307
   See application file for complete search history.

(56) References Cited

U.S. PATENT DOCUMENTS

| | | | | |
|---|---|---|---|---|
| 3,599,182 A | * | 8/1971 | Henle | 365/227 |
| 4,404,630 A | * | 9/1983 | Belforte et al. | 370/479 |
| 4,606,069 A | * | 8/1986 | Johnsen | 382/243 |
| 5,008,859 A | * | 4/1991 | Cyr | 367/2 |
| 5,301,285 A | * | 4/1994 | Hanawa et al. | 712/212 |
| 5,438,668 A | * | 8/1995 | Coon et al. | 712/204 |
| 5,537,629 A | * | 7/1996 | Brown et al. | 712/210 |
| 5,675,331 A | * | 10/1997 | Watanabe et al. | 341/67 |
| 5,778,440 A | * | 7/1998 | Yiu et al. | 711/154 |
| 6,535,450 B1 | * | 3/2003 | Ryan et al. | 365/230.03 |
| 7,149,825 B2 | * | 12/2006 | Bunker et al. | 710/60 |
| 7,360,060 B2 | * | 4/2008 | Chauvel et al. | 712/209 |
| 7,433,260 B2 | * | 10/2008 | Asauchi | 365/230.05 |
| 7,519,995 B2 | * | 4/2009 | Cho et al. | 726/22 |
| 7,769,909 B2 | * | 8/2010 | Ho et al. | 710/5 |
| 7,929,356 B2 | * | 4/2011 | De Caro et al. | 365/189.05 |
| 8,009,769 B2 | * | 8/2011 | Arzel et al. | 375/340 |
| 2004/0019843 A1 | * | 1/2004 | Kishino | 714/755 |
| 2008/0133779 A1 | * | 6/2008 | Ho et al. | 710/5 |
| 2009/0059692 A1 | | 3/2009 | Park | |

* cited by examiner

*Primary Examiner* — Paul R Myers
(74) *Attorney, Agent, or Firm* — McClure, Qualey & Rodack, LLP

(57) ABSTRACT

A decoding circuit for decoding a command is provided. The received command is transmitted during at least two clock periods of a clock signal, and the received command is divided to a former encoded data and a latter encoded data. The decoding circuit includes a pre-trigger signal generating unit, a comparing unit, and a starting signal generating unit. The pre-trigger signal generating unit receives the former encoded data and generates a pre-trigger signal when the former encoded data of the received command matches the corresponding former encoded data of a predetermined command. The comparing unit generates a match signal when the latter encoded data of the received command is the same with the latter encoded data of the predetermined command. The starting signal generating unit outputs a starting signal according to the pre-trigger signal and the match signal. The starting signal starts a corresponding operation of the predetermined command.

10 Claims, 4 Drawing Sheets

US 8,453,006 B2

COMMAND DECODING METHOD AND CIRCUIT OF THE SAME

This application claims the benefit of Taiwan application Serial No. 98145616, filed Dec. 29, 2009, the subject matter of which is incorporated herein by reference.

BACKGROUND OF THE INVENTION

1. Field of the Invention

The invention relates in general to a method and a circuit for decoding a received command, and more particularly to a method and a circuit for decoding a received command for improving the efficiency of a memory device.

2. Description of the Related Art

FIG. 1 is a timing diagram showing the timing diagram of a number of signals in a conventional command decoder when the command decoder decodes a received command. In general, command decoder can be used in a memory device for decoding commands from a host device. The command decoder receives a number of input signals SIO[3:0] in parallel (including signals SIO[3], SIO[2], SIO[1], and SIO[0] which are received in parallel by four pins) through which the encoded data of a command is delivered, and decodes the encoded data to generate a starting signal MODE to make the memory device to perform a corresponding operation. In a conventional command decoder, however, the starting signal MODE lags behind the input signals SIO[3:0] for the sum of at least three time delays t1, t2, and t3 as shown in FIG. 1, which is detailed as follows.

The command decoder is usually operated with reference to an external clock signal SCK, which allows internal circuits of the memory device to be operated synchronously. The encoded data of the command are delivered through the input signals SIO[3:0] with respect to different pulse duration of the external clock signal SCK. For example, as shown FIG. 1, the command includes 8-bit encoded data, in which upper 4-bit encoded data CMD[3:0] are delivered through the input signals SIO[3:0] with respect to a first pulse duration D1 of the external clock signal SCK, and lower 4-bit encoded data CMD[7:4] are delivered through the input signals SIO[3:0] with respect to a second pulse duration D2 of the external clock signal SCK. The input signals SIO[3:0] usually lead ahead the external clock signal SCK under the requirement of setup time and hold time. In this regard, the external clock signal SCK will lag behind the input signal SIO for a time delay t1, as shown in FIG. 1.

Moreover, the external clock signal SCK can be converted by circuit elements into an internal clock signal CLK which is used as a reference clock for sampling and decoding the encoded data of the command obtained from the input signals SIO[3:0]. As such, the internal clock signal CLK for decoding will lag behind the external clock signal SCK for a time delay t2 due to signal transmission delay in the circuit elements. Furthermore, in the course of decoding, the encoded data is sampled at the rising edge of the internal clock signal CLK. Next, logical operation is performed on the encoded data so as to decode the command. As a result, a time delay t3 exists between the internal clock signal CLK and the starting signal MODE.

Such time delays t1 to t3 affect the efficiency of the memory device. The reason is that a time point T at which the starting signal MODE is generated is so late and only time period P is left for the memory device to perform the corresponding operation of the starting signal MODE. In addition, under this situation, for maintaining enough length of the time period P, the period of the clock signal SCK can not be shortened, which causes that the frequency of the external clock signal SCK can not be increased and the efficiency of the memory device can not be increased. Therefore, it is a subject of the industrial endeavors to improve the efficiency of the memory device.

SUMMARY OF THE INVENTION

The invention is directed to a decoding circuit and a decoding method for decoding a command, which can improve the efficiency of the memory device.

According to a first aspect of the present invention, a decoding circuit for decoding a received command is provided. The received command is transmitted during at least two clock periods of a clock signal, and the received command is divided to a former encoded data and a latter encoded data. The decoding circuit includes a pre-trigger signal generating unit, a comparing unit, and a starting signal generating unit. The pre-trigger signal generating unit receives the former encoded data of the received command and generates a pre-trigger signal when the former encoded data of the received command matches the corresponding former encoded data of a predetermined command. The comparing unit generates a match signal when the latter encoded data of the received command is the same with the latter encoded data of the predetermined command. The starting signal generating unit outputs a starting signal according to the pre-trigger signal and the match signal. The starting signal is for starting a corresponding operation of the predetermined command.

According to a second aspect of the present invention, a decoding method for decoding a received command is provided. The received command is transmitted during at least two clock periods of a clock signal. The received command is divided to a former encoded data and a latter encoded data. The decoding method includes the following steps. A pre-trigger signal is generated when the former encoded data of the received command matches the former encoded data of a predetermined command. A match signal is generated when the latter encoded data of the received command is the same with the latter encoded data of the predetermined command. A starting signal is outputted according to the pre-trigger signal and the match signal, the starting signal being for starting a corresponding operation of the predetermined command.

The invention will become apparent from the following detailed description of the preferred but non-limiting embodiments. The following description is made with reference to the accompanying drawings.

DETAILED DESCRIPTION OF THE INVENTION

Embodiments of the invention disclose a decoding circuit and a decoding method for decoding a received command. The received command is transmitted during at least two clock periods of a clock signal, and the received command is divided to a former encoded data and a latter encoded data. The decoding circuit includes a pre-trigger signal generating unit, a comparing unit, and a starting signal generating unit. The pre-trigger signal generating unit receives the former encoded data of the received command and generates a pre-trigger signal when the former encoded data of the received command matches the corresponding former encoded data of a predetermined command. The comparing unit generates a match signal when the latter encoded data of the received command is the same with the latter encoded data of the predetermined command. The starting signal generating unit outputs a starting signal according to the pre-trigger signal and the match signal. The starting signal is for starting a corresponding operation of the predetermined command.

Figure 1:
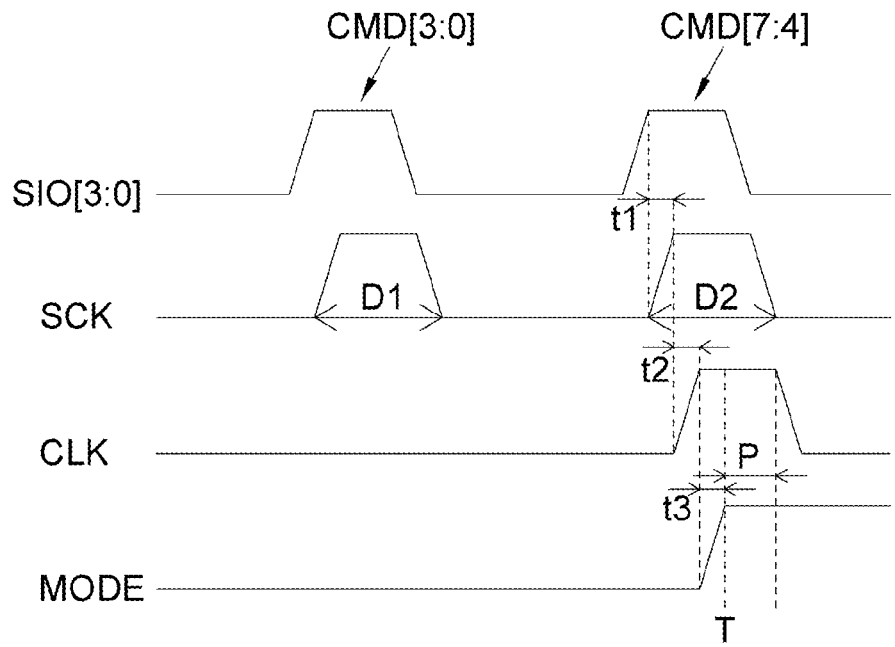
FIG. 1 (Prior Art) is a timing diagram showing the timing diagram of a number of signals in a conventional command decoder when the command decoder decodes a received command.

By generating a pre-trigger signal before the latter encoded data, the starting signal can be generated earlier. That is, the time point of generating the starting signal is moved earlier comparing with the method shown in FIG. 1. Therefore, the efficiency of the memory device can be improved and the memory device can operate under high frequency clock.

Figure 2:
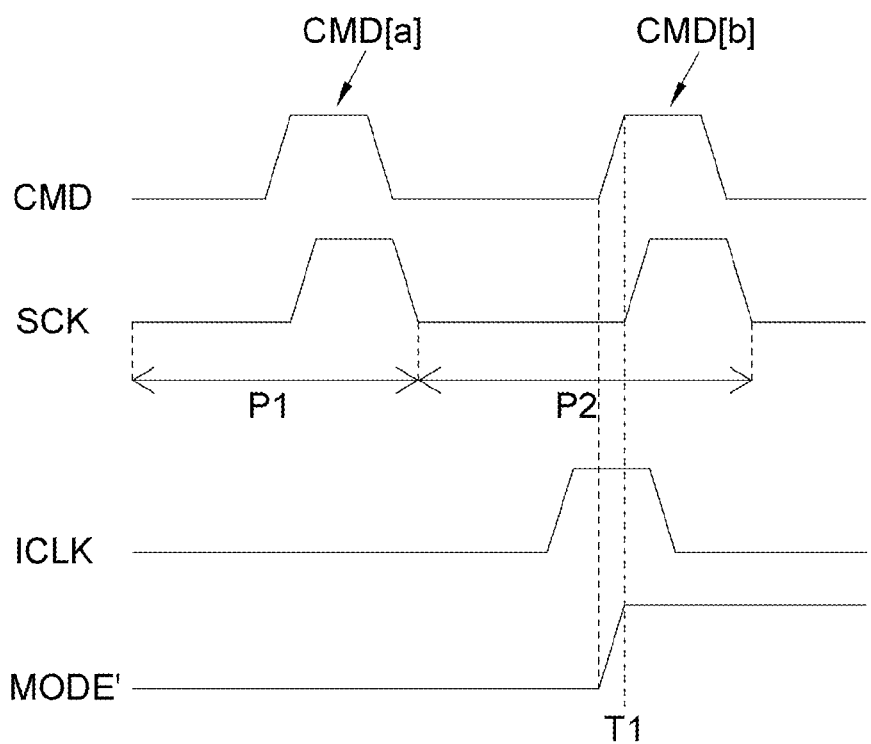
FIG. 2 shows an example of the timing diagram of signals according to an embodiment of the invention.
Figure 3:
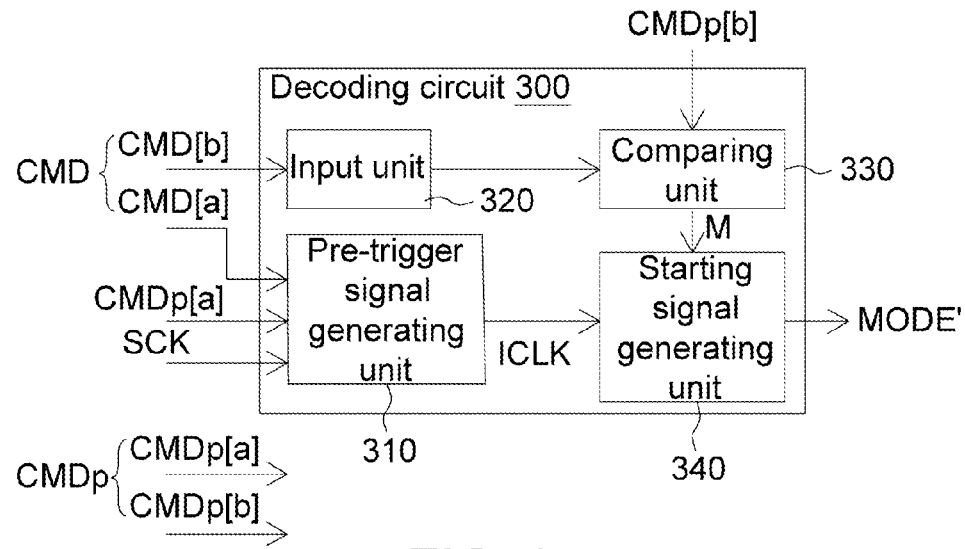
FIG. 3 is a block diagram showing a decoding circuit for decoding a received command according to an embodiment of the invention.

An exemplary embodiment is elaborated below for further description with reference to FIGS. 2 and 3. FIG. 2 shows an example of the timing diagram of signals according to an embodiment of the invention. FIG. 3 is a block diagram showing a decoding circuit for decoding a received command according to the embodiment of the invention. The decoding circuit 300 includes a pre-trigger signal generating unit 310, an input unit 320, a comparing unit 330, and a starting signal generating unit 340. The decoding circuit 300 generates a starting signal MODE' for starting a corresponding operation in response to a received command CMD from a host device (not shown). The starting signal MODE' is for example a mode starting signal, and the starting signal generating unit is for example a mode starting signal generating unit. Assumed that the received command CMD is transmitted during the two clock periods P1 and P2 of the clock signal SCK, the data transmitted in the first clock period P1 is defined as the former encoded data CMD[a], and the data transmitted in the second clock period P2 is defined as the latter encoded data CMD[b].

First, the pre-trigger signal generating unit 310 receives the former encoded data CMD[a] of the received command CMD and generates a pre-trigger signal ICLK when former encoded data CMD[a] of the received command CMD matches the former encoded data CMDp[a] of a predetermined command CMDp.

Next, the comparing unit 330 generates a match signal M when the latter encoded data CMD[b] of the received command CMD is the same with the corresponding latter encoded data CMDp[b] of the predetermined command CMDp. Then, the starting signal generating unit 340 outputs the starting signal MODE' according to the pre-trigger signal ICLK and the match signal M. The starting signal MODE' is used for starting the corresponding operation of the predetermined command CMDp. In this way, comparing to the timing diagram in FIG. 1, the time point at which the decoding circuit 300 generates the starting signal MODE' can be advanced, so that the memory device can perform the corresponding operation of the predetermined command CMDp earlier to improve the efficiency of the memory device and reduce the waiting time of the host device.

Besides, the decoding circuit 300, for example, further includes an input unit 320, for receiving the latter encoded data CMD[b] of the received command CMD, and transmits the latter encoded data CMD[b] to the comparing unit 330.

In the exemplary embodiment, the predetermined command can be one for reading identification-related information of the memory to inform the host device the identification-related information (for example, the manufacturer and the type of the memory device and so on). The identification-related information is, for example, not stored in the memory array of the memory device, so the reading operation for the identification-related information is different from that of the memory array. However, the invention is not limited thereto. The received command CMD is, for example, one having m data unit (the data unit is, for example, the data unit "bit") which are transmitted, from the host device outside the memory device, with respect to an external clock signal SCK. The pre-trigger signal generating unit 310, preferably, can generate the pre-trigger signal ICLK according to the external clock signal SCK. For example, the pre-trigger signal ICLK is generated by delaying for one pulse duration of the external clock signal SCK.

The former encoded data CMD[a] of the received command CMD can at least include, for example, the data of upper bit of the received command CMD, while the latter encoded data CMD[b] of the received command CMD can at least include, for example, the data of lower bit of the received command CMD. In short, in the embodiment, the former encoded data CMD[a] of the received command CMD is firstly compared. When they are the same, it is guessed that the received command CMD may be the predetermined command CMDp, and the pre-trigger signal ICLK is generated. When the latter encoded data CMD[b] of the received command CMD is the same with the corresponding latter encoded data CMDp[b] of the predetermined command CMDp, it is determined that the received command CMD is the predetermined command CMDp and the starting signal MODE' is generated to make the memory device to perform the corresponding operation of the predetermined command CMDp. Comparing the method shown in FIG. 1, the starting signal MODE' of the embodiment is generated earlier than the starting signal MODE in FIG. 1 because the pre-trigger signal ICLK can be generated before the rising edge of the latter encoded data CMD[b]. Consequently, the memory device can perform the corresponding operation of the starting signal MODE' earlier to improve the efficiency of the memory device and reduce the waiting time of the external host device.

The decoding circuit 300 will be described in more detailed way by the two following examples, which is not used to limit the scope of the invention.

FIRST EXAMPLE

Figure 4:
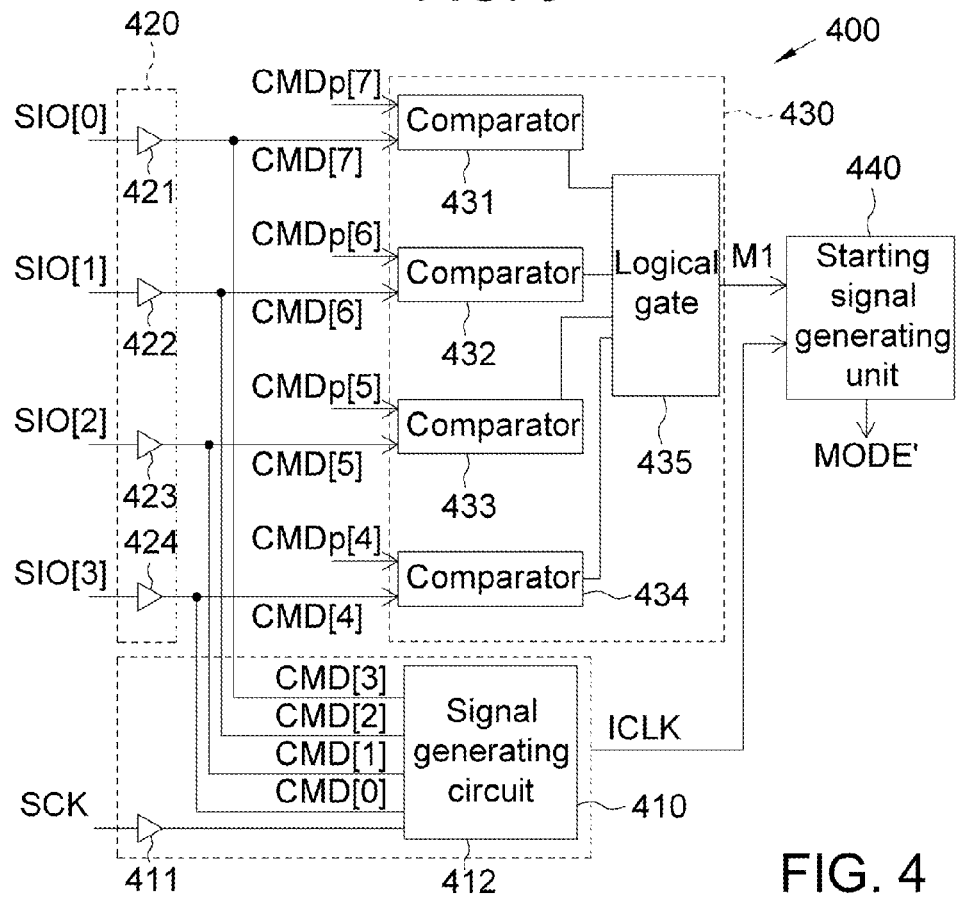
FIG. 4 is a detained circuit diagram of a first example of the decoding circuit in FIG. 3.
Figure 5:
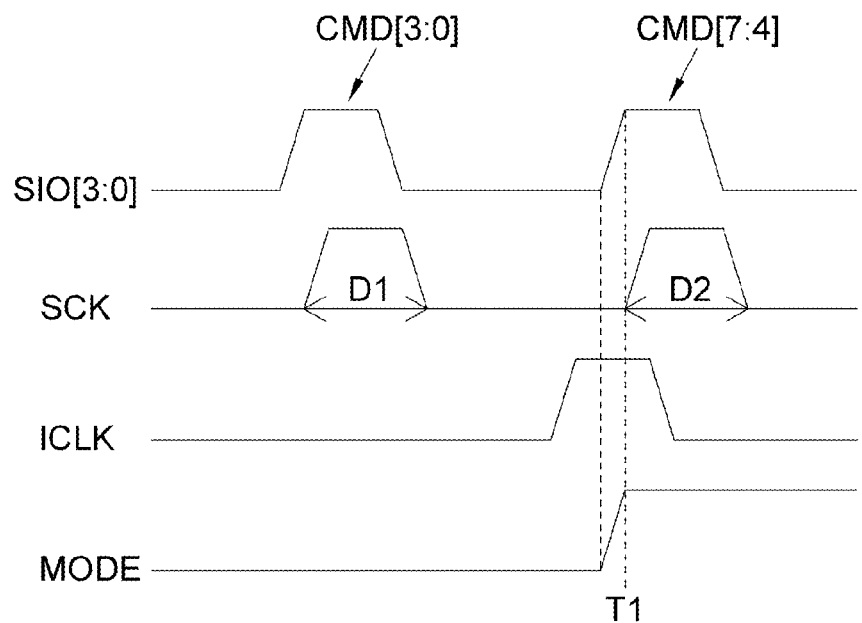
FIG. 5 is a timing diagram showing an example of a number of signals in the decoding circuit in FIG. 4 when the decoding circuit decodes the received command.

In the first example, encoded data of the received command CMD can be transmitted, from the host device, in parallel through a number of input signals with respect to different pulses of the external clock signal. Refer to FIGS. 4 and 5 for further description. FIG. 4 is a detailed circuit diagram of a first example of the decoding circuit in FIG. 3. FIG. 5 is a timing diagram showing an example of a number of signals in the decoding circuit in FIG. 4 when the decoding circuit decodes the received command.

In this example, it is exemplified that the received command CMD has 8-bit encoded data, but the invention is not limited thereto. The 8-bit encoded data of received command CMD are delivered in parallel through four input signals SIO[3:0] which can be measured from four input/output (I/O) pins of the decoding circuit 400. For example, as shown in FIG. 5, upper 4-bit encoded data CMD[3:0] are delivered through the four input signals SIO[3:0], respectively, with respect to a first pulse duration D1 of the external clock signal SCK; lower 4-bit encoded data CMD[7:4] are delivered through the four input signals SIO[3:0], respectively, with respect to a second pulse duration D2 of the external clock signal SCK.

As shown in FIG. 4, the decoding circuit 400 includes a pre-trigger signal generating unit 410, an input unit 420, a comparing unit 430, and a starting signal generating unit 440. The pre-trigger signal generating unit 410 includes a buffer 411 and a signal generating circuit 412. The buffer 411 is for receiving the external clock signal SCK. The signal generating circuit 412 can, for example, determine whether the upper 4-bit encoded data CMD[3:0] of the received command CMD matches upper 4-bit encoded data CMDp[3:0] of the predetermined command CMDp. If yes, the signal generating circuit 412 generates a pre-trigger signal ICLK according to the external clock signal SCK. Specifically, the signal generating circuit 412 can, for example, delay a corresponding pulse of the first pulse duration D1 to generate the pre-trigger signal ICLK. In this way, the generated pre-trigger signal ICLK is enabled before the second pulse duration D2 of the external clock signal SCK with respect to which the lower 4-bit encoded data CMD[7:4] of the received command CMD are obtained.

The input unit 420 includes four buffers 421 to 424 for receiving the four input signals SIO[3:0], respectively, so as to receive the lower 4-bit encoded data CMD[7:4] of the received command CMD therefrom. The comparing unit 430 includes four comparators 431 to 434 and a logical gate 435. Each of the comparators 431 to 434 can be implemented by an exclusive OR gate, and the comparators 431 to 434 are for comparing the lower 4-bit encoded data CMD[7:4] of the received command CMD with the lower 4-bit encoded data CMDp[7:4] of the predetermined command CMDp, respectively. The logical gate 435 can be implemented by an AND gate to collect the comparison results thereof, and is for providing a match signal M1 to the starting signal generating unit 440. The match signal M1 indicates that the lower 4-bit encoded data CMD[7:4] of the received command CMD matches the lower 4-bit encoded data CMDp[7:4] of the predetermined command CMDp.

In practical, each bit of data in the lower 4-bit encoded data CMDp[7:4] is in binary form, and can be represented by one of a high level voltage and a low level voltage, such as a power voltage and a ground voltage. In this regard, each of the comparators 431 to 434 can be coupled to the high level voltage or the low level voltage so as to obtain the lower 4-bit encoded data CMDp[7:4]. For example, the comparators 431 to 434 can all be coupled to the high level voltage if the predetermined command CMDp is one having encoded data of "0xFF", in which lower 4-bit encoded data is the second "F" in hexadecimal form, i.e., "1111" in binary form.

The starting signal generating unit 440 can be implemented by a latch, which is coupled to the pre-trigger signal generating unit 410 to receive the pre-trigger signal ICLK. Being triggered by the pre-trigger signal ICLK, the latch generates the starting signal MODE' which follows the match signal M1. As such, the starting signal MODE' can be enabled around a time point T1 at which the decoding circuit 400 receives the input signals SIO[3:0], as shown in FIG. 5. Therefore, the starting signal MODE' can be enabled earlier than that in FIG. 1, and the efficiency of the memory device is improved. Besides, the period of the external clock signal SCK can be further shortened to increase the frequency of the external clock signal SCK.

SECOND EXAMPLE

Figure 6:
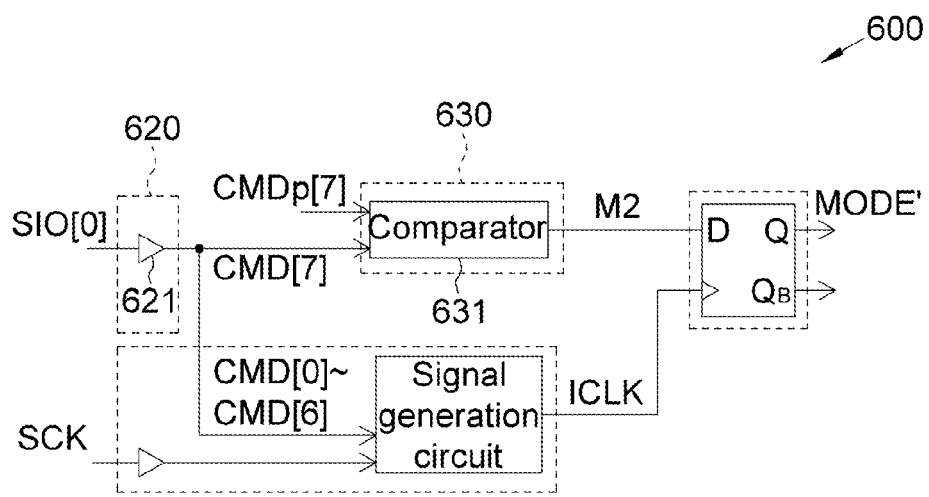
FIG. 6 is a detailed circuit diagram showing the second example of the decoding circuit in FIG. 3.
Figure 7:
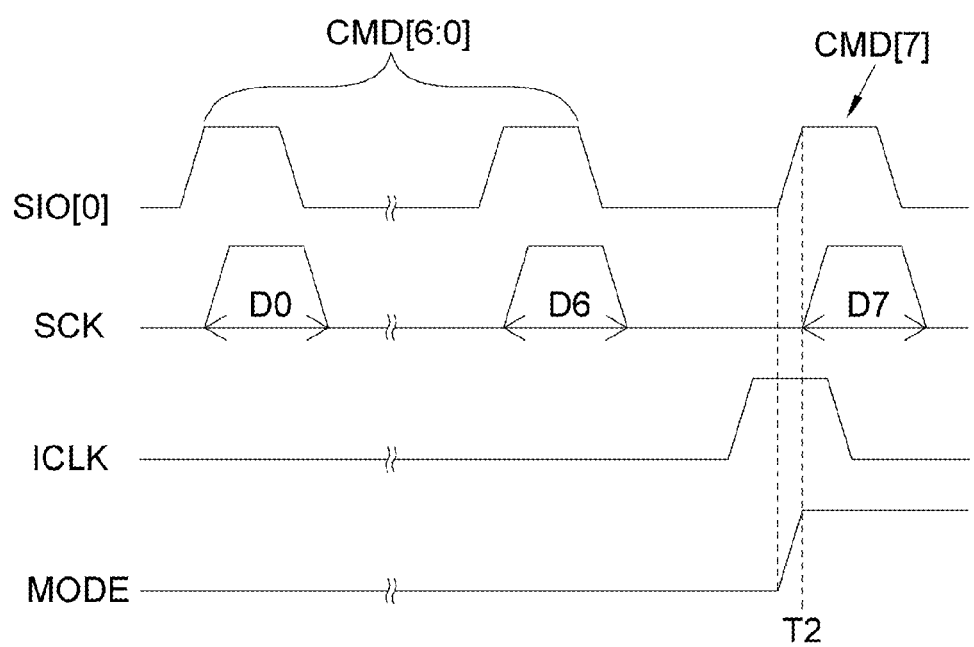
FIG. 7 is a timing diagram showing an example of a number of signals in the command decoder in FIG. 6 when the decoding circuit decodes a received command.

In the second example, encoded data of a command can be delivered, from the host device, sequentially through an input signal with respect to different cycles of the external clock signal. Refer to FIGS. 6 and 7 for further description. FIG. 6 is a detailed circuit diagram showing the second example of the decoding circuit in FIG. 3. FIG. 7 is a timing diagram showing an example of a number of signals in the command decoder in FIG. 6 when the decoding circuit decodes the received command.

In this example, the 8-bit encoded data of received command CMD are transmitted sequentially through an input signals SIO[0], which can be measured from an I/O terminal of the decoding circuit 600. For example, as shown in FIG. 7, upper 7-bit encoded data CMD[6:0] are sequentially delivered through the input signal SIO[0] with respect to pulse durations D0 to D6 of the external clock signal SCK, and least significant bit (LSB) encoded data CMD[7] is delivered through the input signal SIO[0] with respect to a pulse duration D7 of the external clock signal SCK.

As shown in FIG. 6, the decoding circuit 600 differs with the decoding circuit 400 in that the decoding circuit 600 generates the starting signal MODE' only by fetching encoded data from the input signal SIO[0]. The input unit 620 includes a buffer 621 for receiving the input signal SIO[0] so as to fetch the LSB encoded data CMD[7] of the received command CMD therefrom. The comparing unit 630 includes a comparator 631 for comparing LSB encoded data CMD[7] of the received command CMD with LSB encoded data CMDp[7] of the predetermined command CMDp, and for providing a match signal M2 which indicates that the LSB encoded data CMD[7] of the received command CMD matches the LSB encoded data CMDp[7] of the predetermined command CMDp. As for the decoding circuit 600 shown in FIG. 6, some of its operation, thus, can be derived similarly with reference to the above-related description in the first example and will not be described again for the sake of brevity. Similarly, the starting signal MODE' can be enabled around a time point T2 around which the decoding circuit 600 receives the input signal SIO[0], as shown in FIG. 7. Therefore, the starting signal MODE' can be enabled earlier than that in FIG. 1, and the efficiency of the memory device is improved.

In the present example, the decoding circuit 400 of the first example can be used in a quad input/output interface (QPI) serial flash memory, and the decoding circuit 600 of the second example can be used in a single input/output interface (SPI) serial flash memory.

In the present example, since the time point at which the starting signal is generated can be advanced, the memory device can perform the corresponding operation of the starting signal MODE' earlier to improve the efficiency of the memory device and reduce the waiting time of the external host device. Therefore, the memory device can be operated at high frequency clock.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A decoding circuit for decoding a received command, the received command being transmitted during at least two clock periods of a clock signal, the received command being divided to a former encoded data and a latter encoded data, the decoding circuit comprising:
    a pre-trigger signal generating unit for receiving the former encoded data of the received command and delaying the clock signal to generate a pre-trigger signal when the former encoded data of the received command matches the corresponding former encoded data of a predetermined command;
    a comparing unit, for generating a match signal when the latter encoded data of the received command is the same with the latter encoded data of the predetermined command; and
    a starting signal generating unit, for outputting an starting signal according to the pre-trigger signal and the match signal, the starting signal being for starting a corresponding operation of the predetermined command.

2. The decoding circuit for decoding the received command according to claim 1, further comprising an input unit for receiving the latter encoded data of the received command in parallel, and the comparing unit comprising:
    a plurality of comparators for comparing the data of each data unit of the latter encoded data of the received command with the corresponding data of each data unit of the latter encoded data of the predetermined command respectively; and
    a logical gate coupled to the comparators, for providing a match signal accordingly.

3. The decoding circuit according to claim 2, wherein each comparator is implemented by an exclusive OR gate, and the logical gate is implemented by an AND gate.

4. The decoding circuit according to claim 1, wherein the starting signal generating unit is implemented by a latch.

5. The decoding circuit according to claim 1, further comprising a input unit, for receiving the latter encoded data of the received command sequentially, the latter encoded data of the received command comprising data of one data unit, the comparing unit comprising:
    a comparator for comparing the data of one data unit of the latter encoded data of the received command with the corresponding data of one data unit of the latter encoded data of the predetermined command, and providing a match signal accordingly.

6. The decoding circuit according to claim 1, wherein the decoding circuit is for use in a memory, and the predetermined command is for reading identification-related information of the memory.

7. A decoding method for decoding a received command, the received command being transmitted during at least two clock periods of a clock signal, the received command being divided to a former encoded data and a latter encoded data, the decoding method comprising the steps of:
    delaying the clock signal to generate a pre-trigger signal when the former encoded data of the received command matches the former encoded data of a predetermined command;
    generating a match signal when the latter encoded data of the received command is the same with the latter encoded data of the predetermined command; and
    outputting an starting signal according to the pre-trigger signal and the match signal, the starting signal being for starting a corresponding operation of the predetermined command.

8. The decoding method according to claim 7 further comprising:
    receiving the latter encoded data of the received command in parallel;
    wherein the step of comparing comprises:
    comparing the data of each data unit of the latter encoded data of the received command with the corresponding data of each data unit of the latter encoded data of the predetermined command respectively by using a plurality of comparators; and
    providing a match signal accordingly by using a logical gate coupled to the comparators.

9. The decoding method according to claim 7, further comprising:
    receiving the latter encoded data of the received command sequentially, the latter encoded data of the received command comprising data of one data unit
    wherein the step of generating the match signal comprises:
    comparing the data of one data unit of the latter encoded data of the received command with the corresponding data of one data unit of the latter encoded data of the predetermined command by using a comparator and providing a match signal accordingly.

10. The decoding method according to claim 7, being for use in a memory, wherein the predetermined command is for reading identification-related information of the memory.

* * * * *